United States Patent [19]

Chang et al.

[11] Patent Number: 5,196,463
[45] Date of Patent: Mar. 23, 1993

[54] NON-POSTCURE VULCANIZING COMPOSITION AND ELASTOMERS MADE THEREFROM

[75] Inventors: Eugene Chang, Bridgewater, N.J.; Robert Cody, Stamford, Conn.; Edward Mazzone, Bound Brook, N.J.

[73] Assignee: Enichem Elastomeri S.r.l., Milan, Italy

[21] Appl. No.: 650,250

[22] Filed: Feb. 7, 1991

[51] Int. Cl.⁵ .................................................. C08K 5/34
[52] U.S. Cl. ........................................ 524/100; 524/100; 524/203; 524/398; 524/399; 524/523; 524/519
[58] Field of Search ................. 524/100, 203, 398, 399

[56] References Cited

U.S. PATENT DOCUMENTS

| | | | |
|---|---|---|---|
| 3,622,547 | 11/1971 | Ermidis | 525/348 |
| 4,352,903 | 10/1982 | Abeler | 524/399 |
| 4,403,058 | 9/1983 | Dohi et al. | 524/398 |
| 4,632,950 | 12/1986 | Kmiec et al. | 524/203 |
| 4,925,883 | 5/1990 | Baker | 524/399 |
| 4,948,834 | 8/1990 | Baker et al. | 524/519 |
| 4,992,494 | 2/1991 | Odaira et al. | 524/399 |
| 5,053,450 | 10/1991 | Coran | 524/506 |

FOREIGN PATENT DOCUMENTS

| | | | |
|---|---|---|---|
| 01008845 | 8/1979 | Japan | 524/399 |

*Primary Examiner*—Paul R. Michl
*Assistant Examiner*—Olga Asinovsky
*Attorney, Agent, or Firm*—Oblon, Spivak, McClelland, Maier & Neustadt

[57] ABSTRACT

A method is disclosed for the vulcanization of acrylic gums having active halogen groups, comprising adding thereto a mixture of trithiocyanic acid, a metal salt of an aliphatic organic acid and a metal dialkyl dithiocarbamate and applying heat to the resulting mixture. The resultant vulcanizate does not require conventional oven post cure processing.

50 Claims, No Drawings

NON-POSTCURE VULCANIZING COMPOSITION AND ELASTOMERS MADE THEREFROM

FIELD OF THE INVENTION

This invention relates generally to a non-postcure vulcanizing composition and the elastomers made therefrom More particularly, the present invention relates to a non-postcure polyacrylate vulcanizing system. The invention further relates to a method of producing elastomers from the claimed non-postcure vulcanizing composition.

BACKGROUND OF THE INVENTION

Polyacrylic elastomers have many properties including good heat and oil stability which make them desirable for the production of various rubberlike products such as, for example, gaskets, hoses, conveyor belts, valve seals, packings, oil seals and the like.

However, polyacrylic elastomers are difficult to vulcanize even when they contain vulcanization sites such as active halogen or epoxy groups. Generally, to achieve optimum properties the molded parts require a postcure process in an oven to complete their cure. This is due to the cure rate being too slow due to the use of conventional curing agents. If the processing temperature is increased to accelerate the cure time during molding, the elastomers cure prematurely (scorch) which is not desired for proper molding. The postcure process which is therefore necessary involves capital expense, and additional labor and energy costs.

U.S. Pat. No. 3,622,547 disclosed a vulcanizable acrylic composition having an improved cure rate. It was said to provide a vulcanizable composition containing an acrylic elastomer having active halogen groups an improved state of cure and improved aging properties. This was accomplished by providing a vulcanizable composition containing an acrylic gum and a combination of a dithiocarbamic acid derivative and trithiocyanuric acid in an amount sufficient to vulcanize the composition.

The compositions disclosed in U.S. Pat. No. 3,622,547 and other prior art publications, however, cannot very well meet the two critical needs that a non-postcure system requires, namely a fast cure rate and good scorch protection. It is well known in the art that scorch protection is probably the most important factor in elastomer production. Scorchiness leads to premature curing of the elastomer, causing poor flow of the gums from which the elastomers are produced and consequent clogging of the molding apparatus. Reducing the processing temperature and/or lowering the curative content in the gums do improve scorch protection but instead lower the cure rate to unacceptably low levels.

In recent years, the trend has focused upon the development of non-postcure curative systems. For example, these systems are disclosed in the following publications.

R.M. Montagne, "Advances in acrylic elastomer cure technology" Rubber World, Volume 199, No. 3, 20 (1988).

E. Lauretti et al., "Enichem Acrylic Elastomers", PRI Rubber Conference (1984).

L.M. Centric et al., Detroit Rubber Group Technical Meeting, Detroit, MI (Oct. 13, 1988).

It is therefore an object of the present invention to provide a curative mixture that, after compounding with an acrylic gum in the usual manner, provides good scorch protection while still providing relatively high cure rates such that postcuring is not required.

SUMMARY OF THE INVENTION

The present invention is directed to novel vulcanizable compositions which do not require postcuring, said compositions comprising
(a) at least one acrylic gum having active halogen groups;
(b) trithiocyanuric acid;
(c) at least one metal salt of an aliphatic organic acid;
(d) a metal dialkyl dithiocarbamate, and
(e) optional fillers and other inert additives.

DETAILED DESCRIPTION OF THE INVENTION

As understood in the art, components (b), (c) and (d) are often referred to as curatives, curative modifiers and accelerators, or more generically, vulcanizing agents.

The present invention contemplates broadly all vulcanizable compositions containing an acrylic gum (a) having active halogen groups, including those elastomers disclosed, for example, in U.S. Pat. Nos. 3,201,373 and 3,312,677. More specifically, the invention contemplates the use of acrylic gums prepared by polymerizing alkyl acrylates and alkoxyalkyl acrylates, for example ethyl acrylate, butyl acrylate, methoxyethyl acrylate and the like with a chlorine or bromine containing comonomer such as, for example, vinyl chloroacetate, or vinyl benzyl chloride.

Preferably used in the practice of the present invention are polyacrylate gums containing from about 0.1 wt% to about 2.0 wt% of active halogen atoms, which are most preferably chlorine atoms.

Component (b) useful in the practice of the present invention is trithiocyanuric acid, the structure of which is well known.

The metal dialkyl dithiocarbamates (b) useful in the practice of the present invention are those of the formula

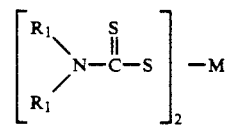

wherein M is a divalent metal ion; and $R_1$ and $R_2$, which may or may not be different, each is an aliphatic radical, an alicyclic radical, or an aryl-substituted alkyl radical.

Preferably, M is a divalent metal ion selected from the group consisting of zinc, copper, cadmium, lead, bismuth, iron and selenium ions. Most preferably, M is a zinc ion.

Preferably, $R_{,1}$ and $R_2$, which may or may not be different, are selected from the group consisting of aliphatic or acyclic radicals having from 1 to about 12 carbon atoms, alicyclic radicals having from 5 to about 8 carbon atoms, a benzyl radical and a pentamethylene radical. Most preferably, $R_1$ and $R_2$ are selected from the group consisting of alkyl radicals having from 2 to about 4 carbon atoms and a pentamethylene radical.

The metal dithiocarbamates useful in the practice of the present invention therefore include zinc dimethyldithiocarbamate; zinc diethyldithiocarbamate, zinc dibenzyldithiocarbamates; zinc pentamethylene dithiocarbamate and the like.

The metal salts of aliphatic organic acids (c) useful in the practice of the present invention are mono-, di- and tri- aluminum salts of organic acids. There include salts of both long chain acids, such as fatty acids (stearic acid, oleic acid, etc.) and short chain acids (acetic acid, butyric acid, hexanoic acid, etc).

Preferably, an aluminum salt of a long chain acid is employed in the practice of the present invention. Most preferably, aluminum distearate is utilized.

The components (b), (c) and (d) are typically used in the practice of the present invention, on a weight percentage basis, as set forth in the ratios below.

Component (b): about 10 about 35 wt. %
Component (c): about 5 about 80 wt. %
Component (d): about 10 about 70 wt. %

Preferably, components (b), (c) and (d) are present in the following ratios set forth below:

Component (b): 15-25 wt. %
Component (c): 20-60 wt. %
Component (d): 25-55 wt. %

Components (b)-(d) are used in the practice of the present invention such that component (b) is present in amounts ranging from about 0.3% about 3.0% (on a weight basis) of component (a). Preferably, components (b)-(d) are present such that component (b) is present in amounts ranging about 0.6% to about 1.5% on the same basis.

The vulcanizable compositions provided by the present invention may also include carbon blacks, stearic acid, fillers, antioxidants, polymeric binders and similar well known additives.

The compositions of the present invention may be prepared by conventional compounding techniques. For instance, the various components may be mixed together on a two-roll mill or in a Banbury mixer. Through use of the present invention a compounded mixture of components (a)-(d) including optional fillers and other additives (e), exhibit very stable properties when stored at room temperature. Further, upon vulcanization, good cure rates coupled with excellent scorch protection are exhibited. Finally, following vulcanization, the elastomers produced exhibit excellent scorch long term stability in a variety of environments.

For convenient application and better effectiveness of the curative (components (b-d)), it is preferred that components b-d be premixed before compounding with the gum (a) and any fillers or other additives (e). Premixing may be accomplished with the components in a powdered form, or more conveniently, they may be premixed with an inert type of "binder" into a free flowing, dust-free bead form or in a. rubbery masterbatch form. Binding dusty powders into beads or producing other masterbatch forms for industrial applications for convenience as well as health concerns is well known in the industry and does not require elaboration herein.

The present invention is further illustrated through reference to the following Examples which should not be construed as limiting the scope of the present invention. All percentages are weight percentages unless otherwise stated.

EXAMPLE 1

A mixture consisting of 16.5 wt. % of trithiocyanuric acid, 32.8 wt % of zinc dimethyldithiocarbamate, 25.7 wt. % of aluminum distearate and 25 wt. % of a polymeric binder was produced into free flowing dust-free beads through use of a mixer.

A vulcanizable composition was then produced by compounding the following components: 100 parts of a polyacrylate gum made from ethvl acrylate, butyl acrylate and vinyl chloroacetate having a chlorine content of 0.3%, 60 parts of a N-550carbon black, 2 parts of a substituted diphenylamine antioxidant, 1 part of a stearic acid processing aid, 2 parts of a high molecular weight fatty acid ester processing aid (Strucktol Co.-WB222) and 4.5 parts of the previously described masterbatch.

EXAMPLE 2-6

The compounded vulcanizable composition of Example 1 was then transferred to a mold and subjected to a pressure at 200°0 C. for the period of time noted in Table 1. No postcure was employed. Properties exhibited by the vulcanizates so produced are noted therein.

TABLE I

| Example No. | 2 | 3 | 4 | 5 | 6 |
|---|---|---|---|---|---|
| Presscure = min. @ 200° C. | 0.5 | 0.75 | 1.0 | 2.0 | 3.0 |
| Original Vulcanizate Properties | | | | | |
| Shore A Hardness | 68 | 69 | 72 | 71 | 71 |
| 100% Modulus, MPa | 5.4 | 5.3 | 6.0 | 6.6 | 6.3 |
| Tensile Strength MPa | 9.7 | 9.7 | 9.6 | 10.2 | 9.9 |
| Elongation, % | 250 | 250 | 222 | 212 | 210 |
| Compression Set*, %, Plied | | | | | |
| 22 Hrs. @ 150° C. | 24 | 27 | 25 | 27 | 21 |
| 70 Hrs. @ 150° C. | 37 | 33 | 27 | 27 | 23 |
| Air-oven Aging, 70 Hrs. @ 150° C. | | | | | |
| Change in Hardness, pts | +3 | +2 | +2 | +2 | +2 |
| Change in Tensile, % | +1 | +3 | +3 | −5 | −3 |
| Change in Elongation, % | +1 | +3 | +1 | +14 | +15 |
| AFT** 70 Hrs. @ 150° C. | | | | | |
| Change in Hardness, pts | −8 | −8 | −9 | −8 | −8 |
| Change in Tensile, % | −1 | −2 | +1 | −5 | −2 |
| Change in Elongation, % | +1 | −1 | +1 | −5 | −2 |
| Volume Change, % | +6 | +4 | +4 | +4 | +4 |

*ASTM 0D-395, Method B
**AFT denotes Dextron TM automatic transmission fluid

It can be seen that even after as little as 0.5 minutes of cure, the physical properties of the resulting elastomer, except for compression set, are as good as those of elastomers cured for longer cure times. After 1 minute of cure, all properties are seen to be excellent.

We claim:
1. A vulcanizable composition comprising
   (a) an acrylic gum having active halogen groups, epoxy groups, or a mixture thereof;
   (b) trithiocyanuric acid;
   (c) an aluminum salt of an aliphatic organic acid; and
   (d) a metal dialkyl dithiocarbamate, wherein said trithiocyanuric acid is present in an amount from about 0.3 wt.% to about 3.0 wt.% relative to the amount of said acrylic gum, said aluminum salt of said aliphatic organic acid is present in a weight ratio of from about 1:7 to about 8:1 with respect to said trithiocyanuric acid, and said metal dialkyl dithiocarbamate is present in a weight ratio of from about 2:7 to about 7:1 with respect to said trithiocyanuric acid.

2. The composition of claim 1 wherein the acrylic gum contains from about 0.1 wt. % to about 2.0 wt. % of activated halogen atoms.

3. The composition of claim 1 wherein the acrylic gum contains from about 0.1 % to about 2.0 wt. % of activated chlorine atoms.

4. The composition of claim 1 wherein the acrylic gum is a copolymer of at least one acrylic monomer and vinyl chloroacetate vinyl ether.

5. The composition of claim 1, wherein the metal dialkyl dithiocarbamate is a compound of the formula

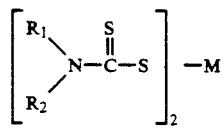

wherein M is a divalent metal ion or selenium; and $R_1$ and $R_2$, each independently is an aliphatic radical, an alicyclic radical, or an aryl-substituted alkyl radical.

6. The composition of claim 5 wherein M is a divalent metal ion selected from the group consisting of zinc, copper, cadmium, lead, bismuth and iron ions.

7. The composition of claim 5 wherein M is a zinc ion.

8. The composition of claim 5 wherein $R_1$ and $R_2$ are selected from the group consisting of acyclic aliphatic radicals having from 1 to about 12 carbon atoms, alicyclic radicals having from 5 to about 8 carbon atoms, a benzyl radical and a pentamethylene radical.

9. The composition of claim 8 wherein $R_1$ and $R_2$ are alkyl radicals having from about 2 to about 4 carbon atoms.

10. The composition of claim 1 wherein the aliphatic organic acids are selected from the group consisting of stearic acid, oleic acid, acetic acid, butyric acid and hexanoic acid.

11. The composition of claim 1 wherein the aluminum salt of an aliphatic organic acid is aluminum distearate.

12. The composition of claim 1 wherein components (b)–(d) are present in amounts ranging as set forth in the ratio
component (b): about 15–about 25 wt. %,
component (c): about 20 about 60 wt. %,
component (d): about 25–about 55 wt. %

13. The composition of claim 12 wherein component (b) is present in amounts ranging from about 0.6 wt. % to about 1.5 wt. % based upon the amount of component (a).

14. A composition useful in the vulcanization of acrylic gums having active halogen groups, comprising
(1) from about 10 to about 35 wt.% of trithiocyanuric acid;
(2) from about 5 to about 80 wt.% of an aluminum salt of an aliphatic organic acid; and
(3) from about 10 to about 70 wt.% of a metal dialkyl dithiocarbamate.

15. The composition of claim 14, wherein the metal dialkyl dithiocarbamate is a compound of the formula

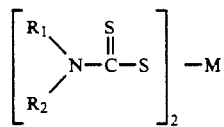

wherein M is a divalent metal ion or selenium; and $R_1$ and $R_2$ each independently is an aliphatic radical, an alicyclic radical, or an aryl-substituted alkyl radical.

16. The composition of claim 15 wherein M is a divalent metal ion selected from the group consisting of zinc, copper, cadmium, lead, bismuth and iron ions.

17. The composition of claim 16 wherein M is a zinc ion.

18. The composition of claim 15 wherein $R_1$ and $R_2$ are selected from the group consisting of acyclic aliphatic radicals having from 1 to about 12 carbon atoms, alicyclic radicals having from 5 to about 8 carbon atoms, a benzyl radical and a pentamethylene radical.

19. The composition of claim 15 wherein $R_1$ and $R_2$ are alkyl radicals having from about 2 to about 4 carbon atoms.

20. The composition of claim 15 wherein the aliphatic organic acids are selected from the group consisting of stearic acid, oleic acid, acetic acid, butyric acid and hexanoic acid.

21. The composition of claim 14 wherein the aluminum salt of an aliphatic organic acid is aluminum distearate.

22. The composition of claim 14 wherein components (b)–(d) are present in amounts ranging as set forth below:
component (b): about 15–about 25 wt. %,
component (c): about 20–about 60 wt. %,
component (d): about 25–about 55 wt. %.

23. The composition of claim 22 wherein component 23 (b) is present in amounts ranging from about 0.6 wt. % to about 1.5 wt. % based upon the amount of the gum.

24. The composition of claim 14, further comprising a binder or an inert additive.

25. The composition of claim 24, wherein said binder or inert additive is selected from the group consisting of carbon black, stearic acid, a filler, an antioxidant, a polymeric binder.

26. The composition of claim 15, wherein M is selenium.

27. The composition of claim 14, wherein said acrylic gum is prepared by polymerizing an alkyl acrylate or an alkoxyalkyl acrylate with vinyl chloroacetate or vinyl benzyl chloride.

28. The composition of claim 27, wherein said alkyl acrylate or alkoxyalkyl acrylate is selected from the group consisting of ethyl acrylate, butyl acrylate and methoxyethyl acrylate.

29. The composition of claim 1, further comprising a binder or an inert additive.

30. The composition of claim 29, wherein said binder or inert additive is selected from the group consisting of carbon black, stearic acid, a filler, an antioxidant and a polymeric binder.

31. The composition of claim 1, wherein said acrylic gum is prepared by polymerizing an alkyl acrylate or an alkoxyalkyl acrylate with vinyl chloroacetate or vinyl benzyl chloride.

32. The composition of claim 31, wherein said alkyl acrylate or alkoxyalkyl acrylate is selected from the group consisting of ethyl acrylate, butyl acrylate and methoxyethyl acrylate.

33. The composition of claim 5, wherein M is selenium.

34. A method of vulcanizing an acrylic gum having active halogen groups, comprising
   (I) mixing said acrylic gum with a first mixture comprising
      (1) from about 10 to about 35 wt.% of said first mixture of trithiocyanuric acid;
      (2) from about 5 to about 80 wt.% of said first mixture of an aluminum salt of an aliphatic organic acid; and
      (3) from about 10 to about 70 wt.% of said first mixture of a metal dialkyl dithiocarbamate,
   wherein said trithiocyanuric acid is present in an amount of from about 0.3 to about 3.0 wt.% of said acrylic gum, to obtain a second mixture; and
   (II) heating said second mixture for a length of time sufficient to vulcanize said second mixture.

35. The method of claim 34, wherein said second mixture is heated to a temperature of 200° C.

36. The method of claim 34, wherein said length of time is from 0.5 to 3.0 minutes.

37. The method of claim 34 wherein the acrylic gum contains from about 0.1 wt. % to about 2.0 wt. % of activated halogen atoms.

38. The method of claim 37 wherein the acrylic gum contains from about 0.1 wt. % to about 2.0 wt. % of activated chlorine atoms.

39. The method of claim 34 wherein the acrylic gum comprises a copolymer of ethyl acrylate and chloroethyl vinyl ether.

40. The method of claim 25, wherein the metal dialkyl dithiocarbamate is a compound of the formula

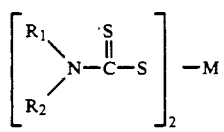

wherein M is a divalent metal ion or selenium; and $R_1$ and $R_2$ each independently is an aliphatic radical, an alicyclic radical, or an aryl-substituted alkyl radical.

41. The method of claim 40 wherein M is a divalent metal ion selected from the group consisting of zinc, copper, cadmium, lead, bismuth and iron ions.

42. The method of claim 41 wherein M is a zinc ion.

43. The method of claim 40 wherein $R_1$ and $R_2$ are selected from the group consisting of acyclic aliphatic radicals having from 1 to about 12 carbon atoms, alicyclic radicals having from 5 to about 8 carbon atoms, a benzyl radical and a pentamethylene radical.

44. The method of claim 43 wherein $R_1$ and $R_2$ are alkyl radicals having from about 2 to about 4 carbon atoms.

45. The method of claim 34 wherein the aliphatic organic acids are selected from the group consisting of stearic acid, oleic acid, acetic acid, butyric acid and hexanoic acid.

46. The method of claim 34 wherein the aluminum salt of an aliphatic organic acid comprises aluminum distearate.

47. The method of claim 34 wherein components (b)–(d) are present in amounts ranging as set forth below:
   component (b): about 15–about 25 wt. %,
   component (c): about 20–about 60 wt. %,
   component (d): about 25–about 55 wt. %.

48. The method of claim 37 wherein component (b) is present in amounts ranging from about 0.6 wt. % to about 1.5 wt. % based upon the amount of component (a).

49. The method of claim 40 wherein M is selenium.

50. The vulcanizate produced in accordance with the method set forth in claim 38.

* * * * *

UNITED STATES PATENT AND TRADEMARK OFFICE
CERTIFICATE OF CORRECTION

PATENT NO. : 5,196,463
DATED : MARCH 23, 1993
INVENTOR(S) : EUGENE CHANG ET AL

It is certified that error appears in the above-identified patent and that said Letters Patent is hereby corrected as shown below:

Column 1, line 8, "therefrom More" should read --therefrom. More--.

Column 2, line 58, "Preferably, R,$_1$ and R$_2$" should read --Preferably, R$_1$ and R$_2$--.

Column 4, line 17, "at 200°0 C" should read --at 200°C--.

Column 5, line 10, "about 0.1% to" should read --about 0.1 wt.% to--.

line 52, "about 20 about 60" should read --about 20-about 60--.

Column 6, line 39, "23 (b) is present" should read --(b) is present--.

Signed and Sealed this

Ninth Day of May, 1995

Attest:

BRUCE LEHMAN

Attesting Officer    Commissioner of Patents and Trademarks